May 20, 1947.   T. F. DOUMANI ET AL   2,420,938
NITRIC ACID AS SELECTIVE SOLVENT IN OXIDATION OF NAPHTHENES
Filed April 10, 1944
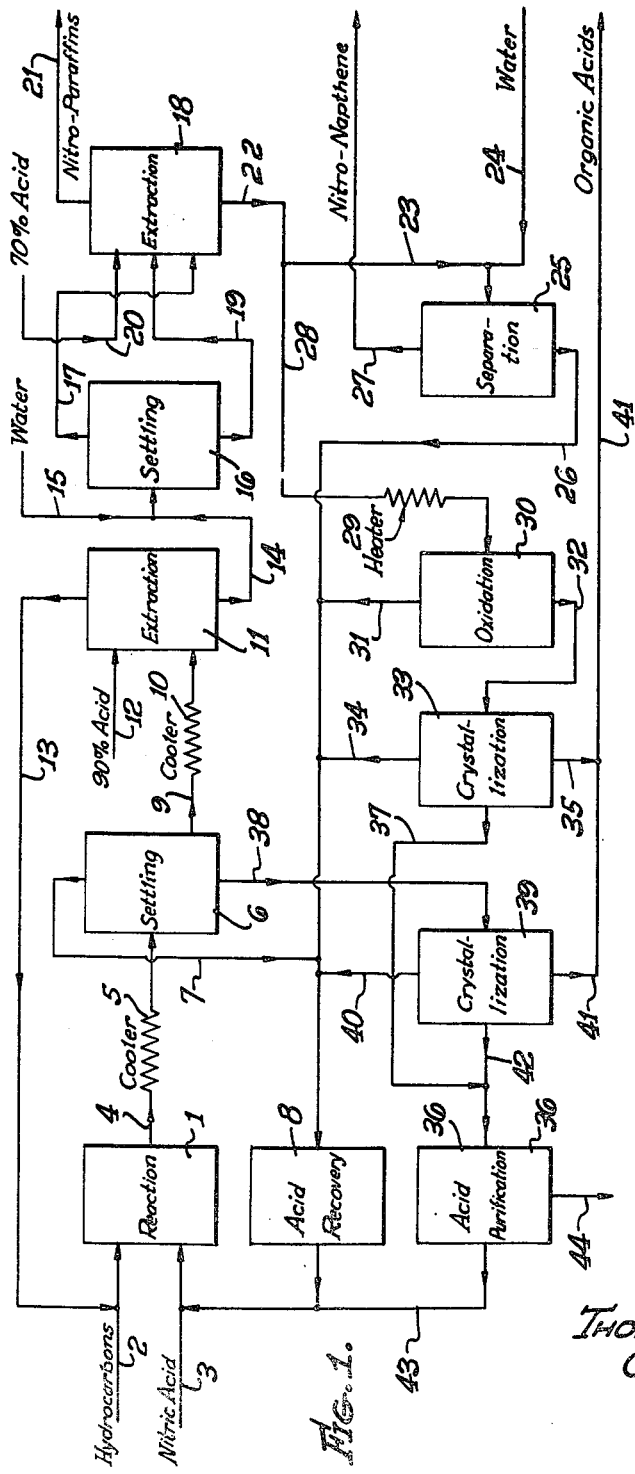
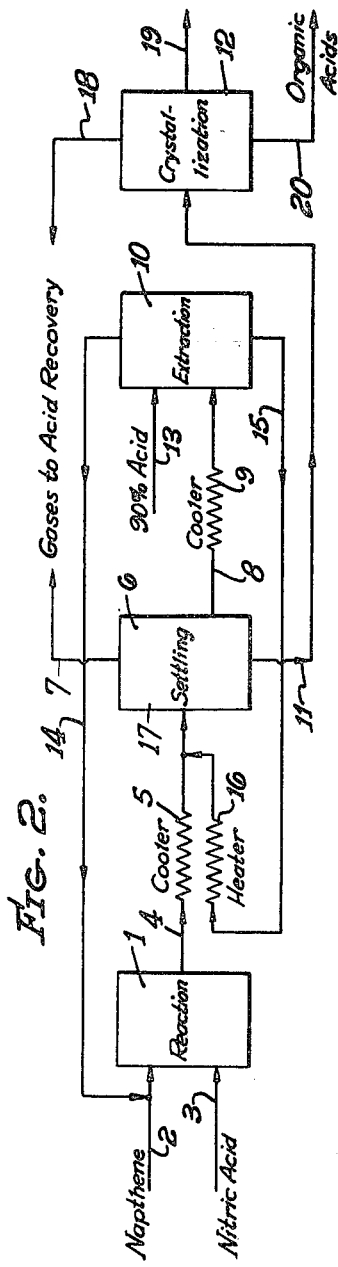
INVENTORS.
THOMAS F. DOUMANI,
CLARENCE S. COE,
ATTORNEY.

Patented May 20, 1947

2,420,938

UNITED STATES PATENT OFFICE 2,420,938

NITRIC ACID AS SELECTIVE SOLVENT IN OXIDATION OF NAPHTHENES

Thomas F. Doumani, Los Angeles, and Clarence S. Coe, Long Beach, Calif., assignors to Union Oil Company of California, Los Angeles, Calif., a corporation of California Application April 10, 1944, Serial No. 530,420

11 Claims. (Cl. 260—533)

This invention relates to the use of nitric acid as a selective solvent for organic nitro-compounds.

Nitration of organic compounds, as with most other reactions also, is seldom capable of going to completion, or even to substantial completion without interference from side reactions which may produce other desirable or undesirable products. This being the case, it is of particular value to be able to separate the products of the nitration reaction from each other, and from unreacted material. It is an object of this invention to provide methods for such separations.

It has been discovered that nitric acid, especially concentrated aqueous nitric acid containing more than about 50% nitric acid by weight, is a very useful selective solvent for separting reaction products of nitration reactions from each other and from the unreacted material. This is especially true of the nitration of hydrocarbons, and one of the most useful applications of the invention is in the nitration of naphthene hydrocarbons as described below.

It is an object of this invention, therefore, to provide a novel selective solvent for the separation of nitro substituted hydrocarbons from hydrocarbons and from each other and it is another object to provide processes for production of derivatives of these compounds, which processes involve selective solvent extraction with nitric acid.

Specific examples of the selective solvent action of concentrated nitric acid follow:

Example I

A mixture of 5 ml. of nitrocyclohexane and 10 ml. of cyclohexane was cooled to $-10°$ C. at which temperature it was still liquid. It was then mixed with 15 ml. of approximately 90% nitric acid which had been precooled to the same temperature. This resulted in the separation of a solid phase, which was apparently relatively pure cyclohexane, which freezes at about $+6.5°$ C. The mixture was then allowed to warm up gradually to about $+10°$ C., at which temperature two distinct liquid layers were formed. Upon separation and analysis of these two layers, it was found that the upper layer (10 ml.) was substantially pure cyclohexane, while the lower layer (20 ml.) was a solution of nitrocyclohexane in nitric acid, 5 ml. of nitrocyclohexane settling out from it when diluted with ice and water. There was no apparent reaction between the nitric acid and either the cyclohexane or the nitrocyclohexane at temperatures of about $+10°$ C. or below.

Similar experiments indicated that at temperatures of about 20° C. or below, other nitric acid solutions having concentrations between about 75% by weight and about 95% by weight would be suitable for separation of other nitronaphthenes from unreacted naphthenes. The separation is particularly applicable to naphthenes having 5 to about 10 carbon atoms, whether unsubstituted naphthenes, such as cyclopentane, cycloheptane, decalin, and the like, or substituted naphthenes, such as dimethyl cyclopentane, ethyl cyclohexane, isopropyl cycloheptane, and the like. Other naphthenes may also be used, however.

Example II

A nitroparaffin, nitro 3 methyl pentane, was mixed with an equal volume of the parent paraffin, 3 methyl pentane, and chilled to about $-5°$ C. About twice the combined volume of the above material, of approximately 90% nitric acid was separately chilled to the same temperature and mixed thoroughly with the above. On settling at the same temperature, two liquid layers were formed, the upper one being substantially pure 3 methyl pentane, and the lower one containing substantially all the acid and nitroparaffin. The nitroparaffin was largely freed from the acid by dilution with about an equal volume of water at about the same temperature.

Similar experiments with other paraffins and nitroparaffins indicated that under about the same conditions described above for the separation of naphthenes from nitronaphthenes, paraffins may be separated from nitroparaffins, using concentrated nitric acid as the selective solvent. The invention is particularly effective for isoparaffins having about 5 to 10 carbon atoms, but is also applicable to other paraffinic hydrocarbons.

It has also been found that nitric acid has a selective extractive action as between nitronaphthene and nitroparaffins of similar molecular weight, the former being somewhat more soluble. This is shown in the following example:

Example III

Approximately equal volumes of nitrocyclohexane and nitroisooctane were blended and mixed thoroughly with about ten times their combined volume of 70% nitric acid at about 20° C. Two phases separated on settling, the lower phase having about eleven times the volume of the upper phase. The upper phase was found to be very largely nitroisooctane, while the lower layer on dilution with water yielded about one volume of a nitrocyclohexane-rich phase.

Similarly, nitric acid may be employed to separate other nitronaphthenes from other nitroparaffins, providing the two materials have about the same molecular weight. Similarly one nitronaphthene may be separated from another nitronaphthene having a different molecular weight, or having a different isomeric configuration. In general, the solubility of the nitro-substituted hydrocarbons in concentrated nitric acid increases with decreasing molecular weight.

It must be realized, that as is the case with other selective solvents also, conditions of temperature, volumes of solvent and feed stock, and efficiency or number of stages of extraction required will depend on the materials to be separated, their concentrations in the feed stock and the degree of purity of product required. The maximum temperatures and maximum concentrations of nitric acid which may be employed will be limited by the point at which the acid begins to react with the feed stock; and the minimum temperatures and concentrations will be limited by the lack of solvent power. These variations are well within the ability of one skilled in the art to determine from the above data. Temperature and concentration ranges somewhat broader than those given above may be employed in some instances.

The above described ability of concentrated nitric acid to act as a selective solvent may be employed in many processes involving the use of nitro compounds in the preparation of other derivatives. Specific examples representative of such processes are shown in the attached drawings, Figure 1 and Figure 2. Figure 2 illustrates a process for preparing adipic acid from pure cyclohexane and Figure 1 illustrates a process for preparing adipic acid from a mixture of cyclohexane and isoparaffins, and concurrently separating nitroparaffins and nitronaphthenes from the product.

Referring to Figure 1, a hydrocarbon feed stock composed of cyclohexane and isoparaffins of similar boiling point is introduced to reaction stage 1 through line 2 while an approximately equal volume of nitric acid having a concentration of approximately 40% by weight is introduced through line 3. The cyclohexane and nitric acid are reacted at a temperature of about 250° C. to obtain a product mixture comprising nitroparaffins, nitrocyclohexane, adipic acid, dilute nitric acid and nitrogen oxides. This mixed product is passed through line 4 and cooler 5 to settling stage 6, wherein it is allowed to separate at a temperature between about 20° C. and 30° C. to form three phases, a gaseous phase, an oil phase and an aqueous phase. The gaseous phase comprising largely nitrogen oxides, is withdrawn through line 7 and sent to the acid recovery system 8. The oil phase, consisting of unreacted hydrocarbons and dissolved nitro-compounds, is withdrawn through line 9 and passed through cooler 10 into extraction system 11. In the extraction system it is contacted at a temperature of about 10° C. with an approximately equal volume of 90% nitric acid introduced through line 12. The acid extracts the nitrocyclohexane from the oil phase, leaving the unreacted cyclohexane which is recirculated through line 13 to reaction zone 1. The nitric acid extract from extraction zone 11 is removed through line 14 in which it is diluted with sufficient water entering through line 15 to reduce the strength of the acid to about 70%. This rejects an oil phase consisting of nitro substituted hydrocarbons, which is allowed to stratify in settling zone 16, and is withdrawn via line 17 and fed into extraction system 18, wherein it is extracted with 70% nitric acid withdrawn from the bottom of settling zone 16 through line 19 and with fresh 70% acid entering through line 20, the total volume of 70% acid used being about ten times the volume of the oil entering through line 17. The temperature in extraction zone 18 is approximately 25° C., the extract in line 14 having been allowed to warm up during dilution and settling.

The raffinate leaving extraction zone 18 through line 21 consists largely of nitroparaffins, which may be recovered and purified or further treated by reduction to amines, oxidation to carboxylic acids, or other processes. Similarly the nitronaphthene in the extract phase withdrawn from zone 18 through line 22 may be rejected, either by cooling or dilution with water, and recovered for use as such or to make additional derivatives. The recovery by dilution and the oxidation to adipic acid are both shown in Figure 1.

In recovering the nitronaphthene in the extract in line 22, this extract is led through line 23 in which it is diluted with water entering through line 24 and discharged into separation zone 25. The aqueous acid phase is withdrawn through line 26 and recycled to acid recovery zone 8 or directly to reaction zone 1 if desired, while the separated nitronaphthene, nitrocyclohexane in this case, is withdrawn through line 27.

If it is desired to convert the nitrocyclohexane in the extract from zone 18 to adipic acid, it is passed through line 28 and heater 29 to oxidation zone 30 wherein the desired oxidation takes place at a temperature between about 50° C. and 100° C. in the presence of the 70% nitric acid solvent. The gaseous oxidation products, nitrogen oxides, are withdrawn through line 31 and sent to acid recovery system 8, while the aqueous acid phase containing the adipic acid is withdrawn through line 32 and sent to crystallization zone 33. The water and nitric acid evaporated in zone 33 are sent to acid recovery system 8 via line 34, the crystallized adipic acid is withdrawn through line 35, and the mother liquor is sent to acid purification zone 36 via line 37.

The aqueous phase from settling zone 6 will generally contain adipic acid also, which may be recovered by passing the aqueous phase through line 38 to crystallization zone 39. As in crystallization zone 33, the evaporated water and nitric acid are passed through line 40 to acid recovery system 8, the crystallized adipic acid is withdrawn through line 41, and the mother liquor is passed through line 42 to acid purification system 36.

In purification system 36, the mother liquor may be vacuum distilled to yield a nitric acid distillate of about 40% strength suitable for recycling through line 43 to reaction zone 1, and a solid residue consisting principally of adipic acid which is withdrawn through line 44. In acid recovery zone 8, the nitrogen oxides are oxidized back to nitric acid according to conventional methods, and the nitric acid is recycled to reaction zone 1 or extraction zones 11 or 18.

Figure 2 shows a modification of the process of Figure 1 wherein one extraction stage is eliminated by the use of a pure cyclohexane feed, and also wherein the two crystallization zones are merged into one, and the oxidation zone and the settling zones are merged. The acid recovery and acid purification zones are not shown. The flow is as follows:

The naphthene feed, cyclohexane, is introduced through line 2 into reaction zone 1, wherein it is reacted as described above with nitric acid introduced through line 3. The entire reaction product is withdrawn through line 4 and passed through cooler 5 into settling zone 6. The gases from zone 6 are sent through line 7 to the acid recovery system. The oil phase withdrawn through line 8 is sent through cooler 9 to extraction zone 10, and the aqueous phase is withdrawn through line 11 and sent to crystallization zone 12.

In extraction zone 10, the nitrocyclohexane is separated from the unreacted cyclohexane by extraction with 90% nitric acid introduced through line 13. The unreacted cyclohexane is recycled to reaction zone 1 through line 14, and the aqueous extract is withdrawn through line 15, passed through heater 16, and line 17 into settling zone 6. Sufficient capacity may be introduced into line 17 to provide time to oxidize the nitrocyclohexane to adipic acid. This will not require much time, nor will it require a temperature above about 20° C. to 50° C., since the acid concentration is high.

The gases from the crystallization zone 12 are sent via line 18 to the acid recovery plant. The mother liquor may be withdrawn through line 19 and sent to an acid purification system as described above, and the crystallized adipic acid may be withdrawn through line 20.

Naphthenes other than cyclohexane, such as those described under Example I above, may also be oxidized to obtain dibasic acids as in the above described system of Figure 2. The reaction in zone 1 is preferably carried out at temperatures between about 200° C. and 300° C. although higher and lower temperatures may also be employed. Superatmospheric pressures are generally desirable. The nitric acid may be as dilute as about 20%, or may be as strong as 20% fuming acid or even pure nitrogen dioxide or tetroxide. The extraction conditions in zone 11 may vary as described earlier under Example I.

The system described in Figure 1 is of particular importance for the production of adipic acid since it does not require that the cyclohexane which is oxidized be completely free from paraffins. Cyclohexane as recovered by careful fractionation of naphthenic petroleum oils generally contains an appreciable quantity of isoparaffins, such as 2,2-dimethyl pentane, 2,4-dimethyl pentane, and 2,2,3-trimethyl butane, which boil at almost exactly the same boiling point as cyclohexane. Benzene also boils at approximately the same point, but benzene may be separated by conventional solvent extraction methods using selective solvents such as sulfur dioxide, phenol, concentrated sulfuric acid and the like. It is extremely difficult, however, to separate the isoparaffins from the cyclohexane, and this has hitherto been a bar to the use of cyclohexane recovered directly from petroleum for the manufacture of adipic acid. The system of Figure 1, however, permits the use of such feed stocks and provides additionally for the separation of relatively pure nitroparaffins and nitronaphthenes. The nitronaphthenes, nitrocyclohexane in this case, may then be oxidized in a separate stage if desired, to form additional adipic acid. Other naphthenes and paraffins may be employed as feed stocks, as described under Examples I and II above, and other conditions of operation may be employed, as described in the above descriptions of the processes of Figure 1 and Figure 2. For example, in the process of Figure 1 the treatment of the oil phase from settling zone 6 may be carried out by extracting the nitronaphthene only, with 70% nitric acid in the first stage, and then extracting the nitroparaffins with 90% nitric acid in the second stage. In another mode of operation, this oil phase may be distilled to separate the unreacted hydrocarbons from the nitro- compounds, and the nitronaphthenes separated from the nitroparaffins by extraction with 70% nitric acid, as shown.

It has been found that under certain conditions nitric acid may be employed to separate aromatic hydrocarbons from nitroaromatic hydrocarbons. In this case, the nitric acid must not be too strong, that is above about 80%, and the temperature must not be too high, that is above about 10° C. if nitration of the aromatic hydrocarbons is to be avoided. In general, the nitroaromatics are more soluble in nitric acid than the nitroparaffins and nitronaphthenes of similar weight. They may therefore be separated from the latter compounds by extraction of the latter with 50% to 70% nitric acid.

Modifications of the invention may be made, such as adding solvent modifiers such as inorganic salts, particularly nitrates, to the nitric acid used in the extraction, or further purifying the recirculated hydrocarbon or nitric acid streams, or the product streams, or any other modifications of this invention which would be apparent to one skilled in the art. These are to be considered part of the invention as defined in the following claims:

We claim:

1. A process for the separation of a mixture comprising naphthene hydrocarbons having between about 5 and 10 carbon atoms and their nitro derivatives which comprises extracting the mixture at a temperature below about 20° C. with a selective solvent comprising nitric acid having concentration between about 50% and 95% by weight.

2. A process for the separation of a mixture of nitroparaffins and nitronaphthenes of similar molecular weight which comprises contacting said mixture at a temperature below about 20° C. with a selective solvent comprising concentrated nitric acid.

3. A process for the separation of a mixture of naphthenes and nitronaphthenes which comprises contacting said mixture at a temperature below about 20° C. with a selective solvent comprising nitric acid having a concentration between about 75% and 95% by weight.

4. A process according to claim 2 in which the nitronaphthene is nitrocyclohexane and the nitroparaffins are nitro derivatives of isoparaffins boiling at about the same point as cyclohexane.

5. A process for the production of organic dibasic acids which comprises reacting a naphthene hydrocarbon with concentrated nitric acid at an elevated temperature sufficient to produce a mixture comprising an aqueous phase containing said dibasic acids and an oil phase containing nitronaphthenes and unreacted hydrocarbon, separating the oil phase from the aqueous phase, separating the nitronaphthenes from the unreacted hydrocarbon in the said oil phase by contacting said oil phase with concentrated nitric acid at a temperature below about 20° C. so as to obtain an extract phase containing nitronaphthenes and nitric acid, and heating the said extract phase to an elevated temperature sufficient to form additional dibasic acid.

6. A process for the production of organic dibasic acids which comprises reacting a hydrocarbon feed stock containing naphthenes and isoparaffins of similar molecular weight with concentrated nitric acid at an elevated temperature sufficient to produce a mixture comprising an aqueous phase containing said dibasic acids and an oil phase containing unreacted hydrocarbons, nitroparaffins and nitronaphthenes, separating the oil phase from the aqueous phase, separating the unreacted hydrocarbons from the nitro compounds in said oil phase by distillation, separating the nitroparaffins from the nitronaphthenes by contacting the residual nitro compounds with concentrated nitric acid at a temperature below about 20° C. so as to form an extract phase containing nitronaphthenes and nitric acid, and heating the said extract phase to an elevated temperature sufficient to form additional dibasic acid.

7. A process according to claim 3 in which the naphthene has between about 5 and about 10 carbon atoms.

8. A process according to claim 3 in which the naphthene is cyclohexane.

9. A process for the production of adipic acid which comprises contacting cyclohexane with nitric acid having a concentration greater than 20% by weight at a temperature between about 200° C. and 300° C., thereby producing a mixture comprising an aqueous phase containing adipic acid and an oil phase containing nitrocyclohexane and cyclohexane; separating the oil phase from the aqueous phase; separating the nitrocyclohexane from the unreacted cyclohexane in the said oil phase by contacting said oil phase at a temperature below about 20° C. with nitric acid having a concentration between about 75% and 95% by weight, thereby forming an oil phase containing unreacted cyclohexane and an aqueous extract phase containing nitrocyclohexane; recirculating said oil phase; and heating the said extract phase, thereby forming additional adipic acid.

10. A process for the production of adipic acid which comprises contacting a hydrocarbon feed stock containing cyclohexane and isoparaffins of similar volatility with nitric acid having a concentration greater than about 20% by weight, at a temperature between about 200° C. and 300° C. thereby producing a mixture comprising an aqueous phase containing adipic acid and an oil phase containing unreacted hydrocarbons, nitroparaffins, and nitrocyclohexane; separating the oil phase from the aqueous phase; separating the unreacted hydrocarbons from the nitro compounds in the oil phase by distillation; separating the nitroparaffins from the nitrocyclohexane by contacting the residual nitro compounds with approximately 10 volumes of nitric acid having a concentration of about 70% by weight at a temperature of about 20° C., thereby forming an oil phase containing nitroparaffins and an aqueous extract phase containing nitrocyclohexane; and heating the said extract phase, thereby forming additional adipic acid.

11. A process for the production of organic dibasic acids which comprises reacting a hydrocarbon feed stock containing naphthenes and isoparaffins of similar volatility with concentrated nitric acid at an elevated temperature to produce a mixture comprising an aqueous phase containing said dibasic acids and an oil phase containing nitronaphthenes, separating the oil phase from the aqueous phase, separating the nitronaphthenes from the oil phase by a process involving selectively dissolving said nitronaphthenes in concentrated nitric acid at a temperature below about 20° C., and oxidizing the extracted nitronaphthenes to form additional dibasic acid.

THOMAS F. DOUMANI.
CLARENCE S. COE.

REFERENCES CITED

The following references are of record in the file of this patent:

UNITED STATES PATENTS

| Number | Name | Date |
| --- | --- | --- |
| 967,337 | Day | Aug. 16, 1910 |
| 1,967,667 | Hass et al. | July 24, 1934 |
| 1,273,568 | Barnes | July 23, 1918 |
| 1,225,321 | Flurscheim | May 8, 1917 |
| 2,343,534 | Cavanaugh et al. | Mar. 7, 1944 |
| 2,228,261 | Ellingboe | Jan. 14, 1941 |
| 1,588,027 | Hopkins | June 8, 1926 |
| 2,071,122 | Hass et al. | Feb. 16, 1937 |
| 2,300,955 | Meier | Nov. 3, 1942 |